United States Patent
Moll

(10) Patent No.: US 7,367,685 B2
(45) Date of Patent: May 6, 2008

(54) LIGHTED CABINET ASSEMBLY

(75) Inventor: Gregory R Moll, Alto, MI (US)

(73) Assignee: Nexlite, Grand Rapids, MI (US)

( * ) Notice: Subject to any disclaimer, the term of this patent is extended or adjusted under 35 U.S.C. 154(b) by 79 days.

(21) Appl. No.: 11/358,574

(22) Filed: Feb. 21, 2006

(65) Prior Publication Data

US 2006/0193124 A1 Aug. 31, 2006

Related U.S. Application Data

(60) Provisional application No. 60/656,472, filed on Feb. 25, 2005.

(51) Int. Cl.
*F21V 33/00* (2006.01)
*A47B 97/00* (2006.01)

(52) U.S. Cl. ............... 362/133; 362/134; 312/223.5

(58) Field of Classification Search ............... 362/92, 362/125, 133, 234, 127, 576, 219, 217, 249, 362/252, 123, 132, 227, 154, 253, 94, 152, 362/134, 410, 221; 62/264; 108/23; 312/223.5, 312/114
See application file for complete search history.

(56) References Cited

U.S. PATENT DOCUMENTS

| | | | | |
|---|---|---|---|---|
| 2,600,925 A | * | 6/1952 | Ruch | ............... 312/351 |
| 4,689,726 A | | 8/1987 | Kretzschmar | |
| 4,739,454 A | | 4/1988 | Federgreen | |
| 4,939,625 A | * | 7/1990 | Olson | ............... 362/154 |
| 5,072,343 A | * | 12/1991 | Buers | ............... 362/125 |
| 5,341,943 A | | 8/1994 | Fraser | |
| 5,559,681 A | | 9/1996 | Duarte | |
| 5,580,155 A | | 12/1996 | Hildebrand et al. | |
| 5,961,200 A | | 10/1999 | Friis | |
| 6,179,434 B1 | | 1/2001 | Saraiji | |
| 6,231,205 B1 | * | 5/2001 | Slesinger et al. | ............... 362/133 |
| 6,283,608 B1 | | 9/2001 | Sraat | |
| 6,283,612 B1 | * | 9/2001 | Hunter | ............... 362/240 |
| 6,425,646 B1 | * | 7/2002 | Andrews | ............... 312/114 |
| 6,427,849 B2 | | 8/2002 | Swan | |
| 6,502,959 B2 | | 1/2003 | Lin | |
| 2002/0159741 A1 | | 10/2002 | Graves et al. | |

(Continued)

*Primary Examiner*—John Anthony Ward
*Assistant Examiner*—David R Crowe
(74) *Attorney, Agent, or Firm*—Van Dyke, Gardner, Linn & Burkhart, LLP

(57) ABSTRACT

A lighted cabinet assembly includes a pair of spaced apart sidewalls and a top wall interconnecting the sidewalls. The sidewalls define an interior space therebetween and at least one shelf is supported between the sidewalls. The cabinet assembly further includes a base for supporting the cabinet assembly on a support surface. The base has an upper surface and a lower surface for facing the support surface. The sidewalls extend from the upper surface and are mounted to the base. In addition, each sidewall includes an elongate recess, which extends from the base up at least a portion of the sidewalls. At least one light strip is positioned in each of the recesses for illuminating at least a portion of the interior space of the cabinet assembly. A power cable assembly includes a power cable for electrically coupling to a power supply, at least one light strip cable for electrically coupling to the light strips, and a power harness coupling the power cable to the light strip cable for selectively powering each of the light strips. The power harness and the light strip cables are arranged in a generally planar arrangement in the base.

23 Claims, 16 Drawing Sheets

U.S. PATENT DOCUMENTS

2004/0246716 A1* 12/2004 Hubert et al. ............... 362/227
2005/0195608 A1* 9/2005 Wu ........................... 362/320
2005/0237732 A1* 10/2005 Lagman et al .............. 362/132

* cited by examiner

LIGHTED CABINET ASSEMBLY

This application claims priority to U.S. provisional application entitled LIGHTED CABINET ASSEMBLY, filed Feb. 25, 2005, Ser. No. 60/656,472, by Applicant Gregory R. Moll, which is herein incorporated by reference in its entirety.

TECHNICAL FIELD AND BACKGROUND OF THE INVENTION

The present invention generally relates to a storage cabinet for storing media such as CD's, videotapes, DVD's, or the like and, more specifically, to a lighted cabinet assembly.

SUMMARY

Accordingly, the present invention provides a lighted cabinet assembly that incorporates the use of one or more light strips to illuminate the interior of the cabinet assembly in a manner to reduce shadowing.

In one form of the invention, a lighted cabinet assembly includes a pair of spaced apart sidewalls, a top wall, which interconnects the sidewalls, at least one shelf supported between the sidewalls, and a base for supporting the cabinet assembly on a support surface. Each of the sidewalls includes an elongate recess and at least one light strip positioned in each of the recesses for illuminating at least a portion of the interior. The elongated recesses extend from the base up at least a portion of the sidewalls. The cabinet assembly also includes a power cable assembly, which includes a power cable for electrically coupling to a power supply, at least one light strip cable electrically coupled to the light strips, and a power harness coupling the power cable to the light strip cable for selectively powering each of the light strips. The power harness and the light strip cables are arranged in a generally planar arrangement in the base.

In one aspect, the base has an overall height of less than about 3 inches and, more preferably, less than 2½ inches.

In other aspects, each of the sidewalls includes an outer edge. Preferably, the elongated recesses are spaced inwardly from the outer edges. More preferably, the elongated recesses are positioned between the outer edge of the shelf and the outer edges of the sidewalls.

In other aspects, the lighted cabinet assembly further includes a back wall, which interconnects the sidewalls. Further, the back wall preferably extends between the upper wall and the base.

In yet other aspects, the lighted cabinet assembly further includes a switch. The power cable assembly further includes a switch cable that is electrically coupled to the switch. For example, the switch may be mounted to one of the sidewalls. Where the switch is mounted to one of the sidewalls, the sidewall includes a passage extending up from the base to the switch at an inner surface of the sidewall, with the switch cable extending up from the base through the passage to couple to the switch.

According to yet other aspects, each of the light strips comprise a plurality of light sources. For example the light sources may be incandescent light sources or light emitting diodes. Preferably, the light sources are encapsulated in a flexible extrusion, such as a PVC extrusion.

In another form of the invention, the lighted cabinet assembly includes a pair of spaced apart sidewalls a top wall interconnecting the sidewalls, at least one shelf support between the sidewalls, and a base for supporting the cabinet assembly on a support surface. The base includes a recess at a lower surface thereof to define a compartment. Each of the sidewalls includes an outer edge and an elongate recess adjacent a respective outer edge for receiving at least one light strip positioned therein for illuminating at least a portion of the interior. The cabinet assembly also includes a power cable assembly with a power cable for electrically coupling to a power supply, a light strip cable for each light strip, a coupler for electrically coupling each light strip cable to each light strip, and a power manifold coupling the power cable to the light strip cables for selectively powering each of the light strips. The couplers comprise 90° couplers wherein the power manifold and the light strip cables may be arranged in a generally planar arrangement in the compartment of the base.

In one aspect, the recess extends no greater than 2 inches into the base.

Consequently, the lighted cabinet assembly provides a compact lighted assembly and, further, a lighted cabinet assembly that produces less shadowing.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
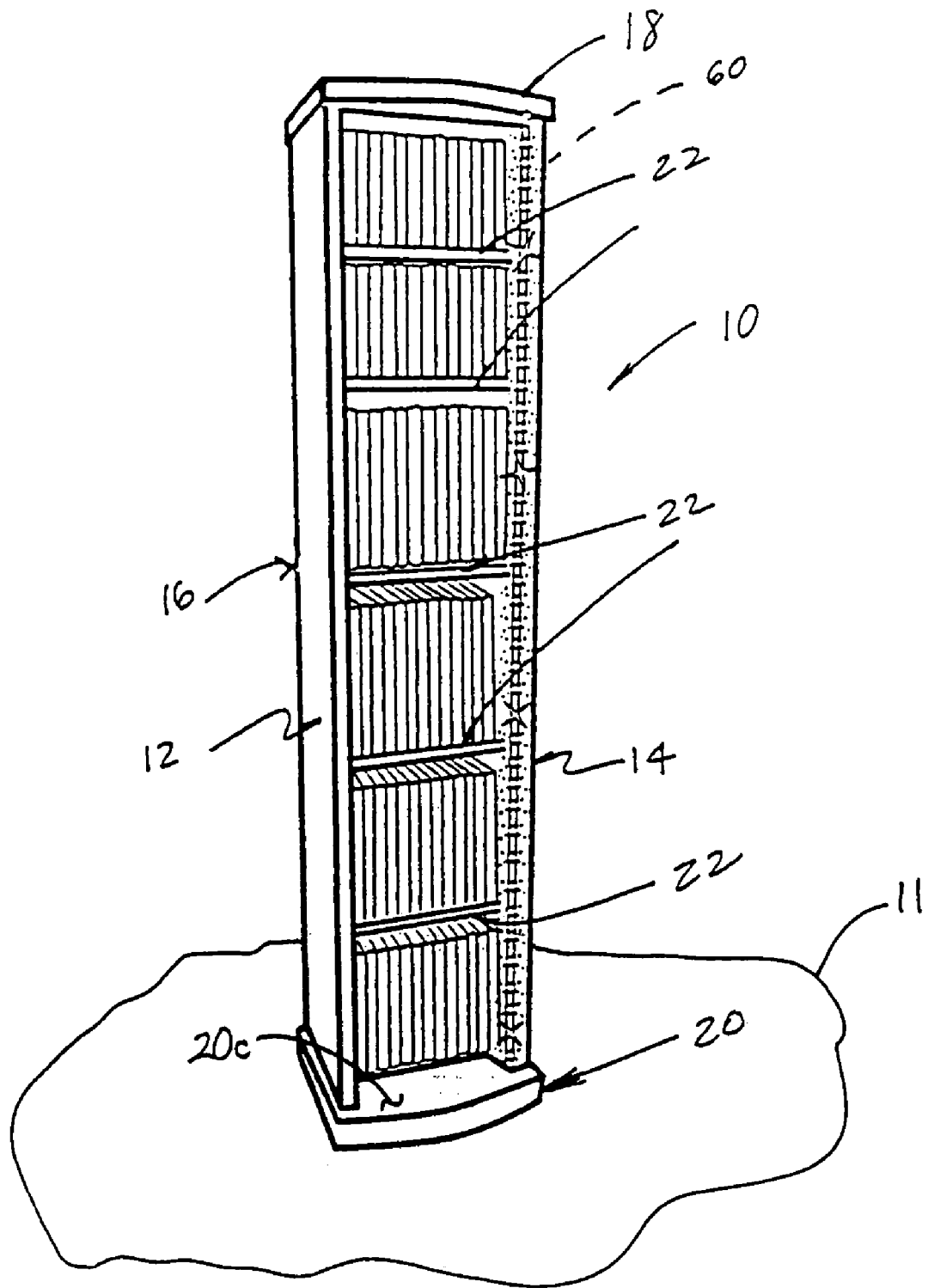
FIG. 1 is a perspective view of a first embodiment of the lighted cabinet assembly of the present invention.

Referring to FIG. 1, the numeral 10 generally designates a lighted cabinet assembly of the present invention. Lighted cabinet assembly 10 is particularly suitable for storing and supporting media, such as CDs, DVDs, and VHS tapes or the like. However, it can be appreciated that other articles may be supported and stored in cabinet 10, including electronic components. As will be more hilly described below, cabinet assembly 10 is supported at a suoport surface 11 and is adapted to illuminate at least a portion of the interior of the cabinet assembly and provide optimal lighting within the interior of the cabinet assembly for visibility while minimizing the shadowing effect. Furthermore, the lighted cabinet assembly may incorporate the use of light emitting diodes, which will light the interior is lighted without generating levels of heat associated with conventional incandescent light sources, which may not be suitable for media, which are typically formed from plastic components, or for electronic devices.

Cabinet assembly 10 includes a pair of sidewalls 12 and 14, a back wall 16, and a top wall 18, which interconnect sidewalls 12 and 14. Sidewalls 12 and 14 and back wall 16 are mounted to a base 20, which houses a power cable assembly for the lighting system of cabinet 10, as will be more fully described below. Extending between sidewalls 12 and 14 are a plurality of shelves 22, which are supported between sidewalls 12 and 14. For example, shelves 22 may be mounted to the sidewalls using conventional mounting devices, such as brackets, pins, or the like, or to the back wall 18 using similar mounting devices. However, it should be understood that the back wall may be eliminated to allow access to the media from both sides of the cabinet assembly. In which case, it may be desirable to include lighting on the back side of the cabinet assembly as well.

Figure 2:
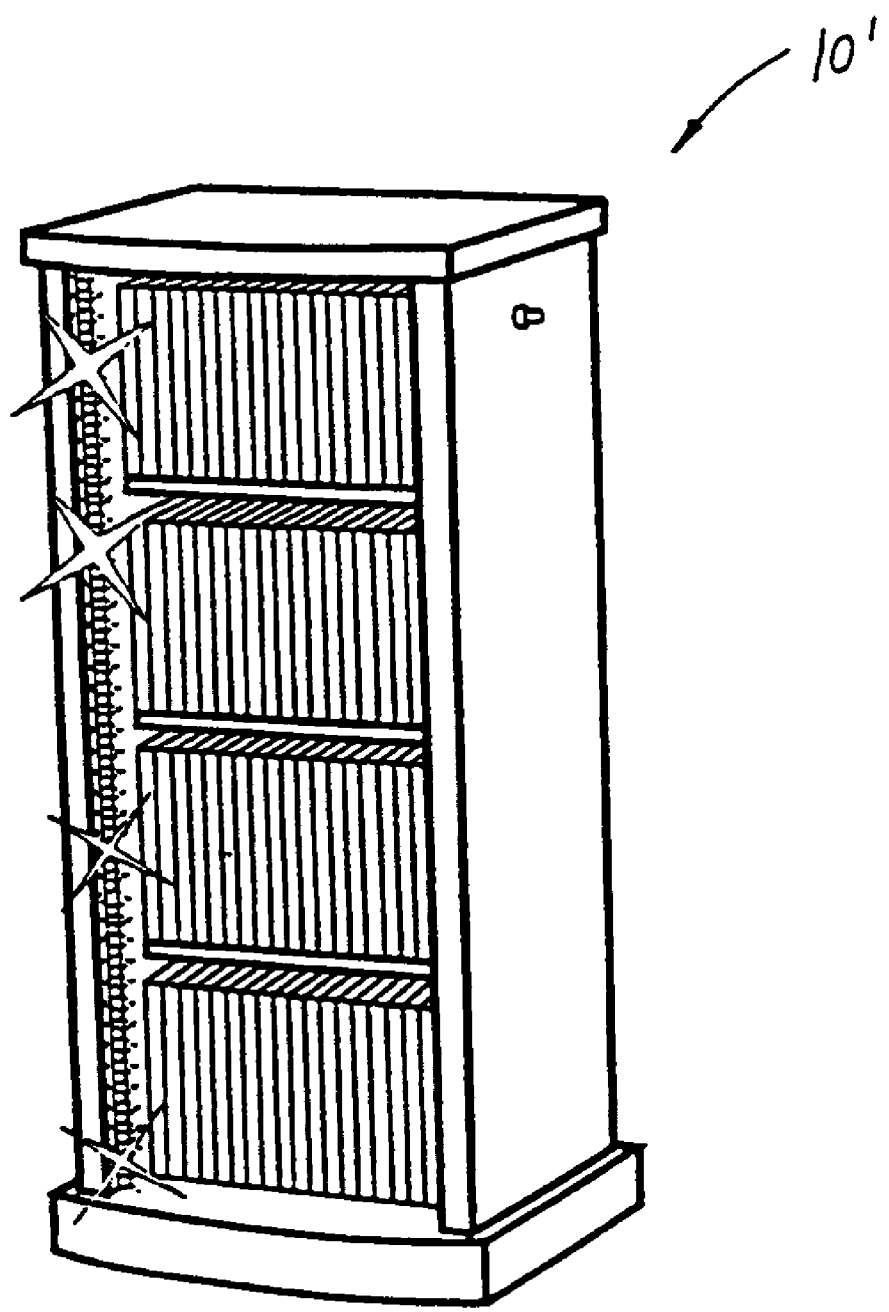
FIG. 2 is perspective view of another embodiment of the lighted cabinet assembly of the present invention.

Referring to FIG. 2, it should be understood that the height of sidewalls 12 and 14 and the number of shelves may be varied, such as illustrated in lighted cabinet assembly 10'. Lighted cabinet assembly 10' is constructed in a similar manner to cabinet assembly 10 but includes a wider base and fewer shelves.

Figure 6:
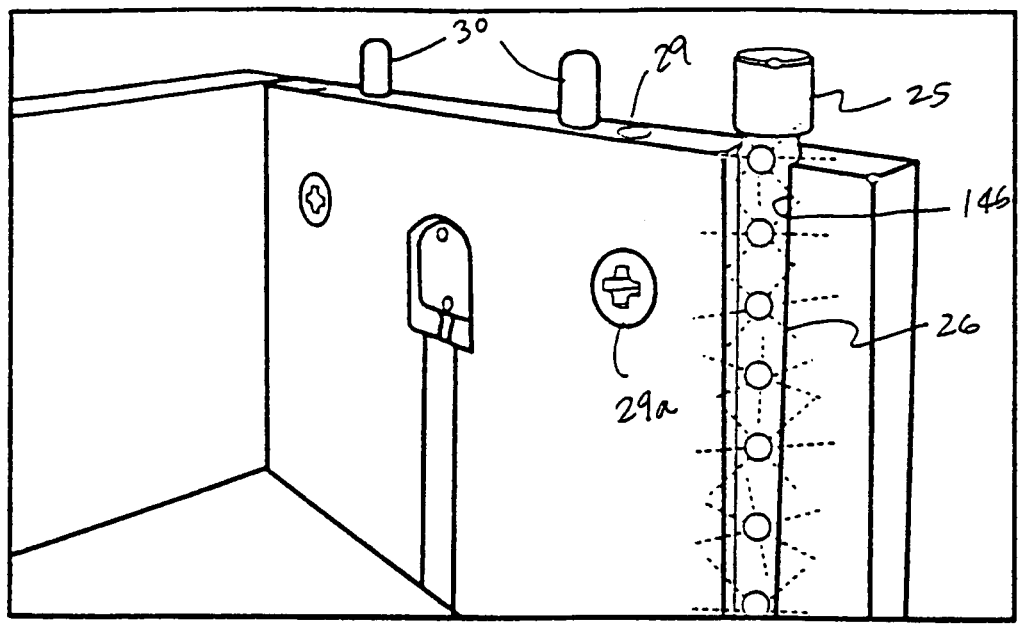
FIG. 6 is an inside right-hand side perspective view of the cabinet assembly of FIG. 4 with the top member removed.
Figure 7:
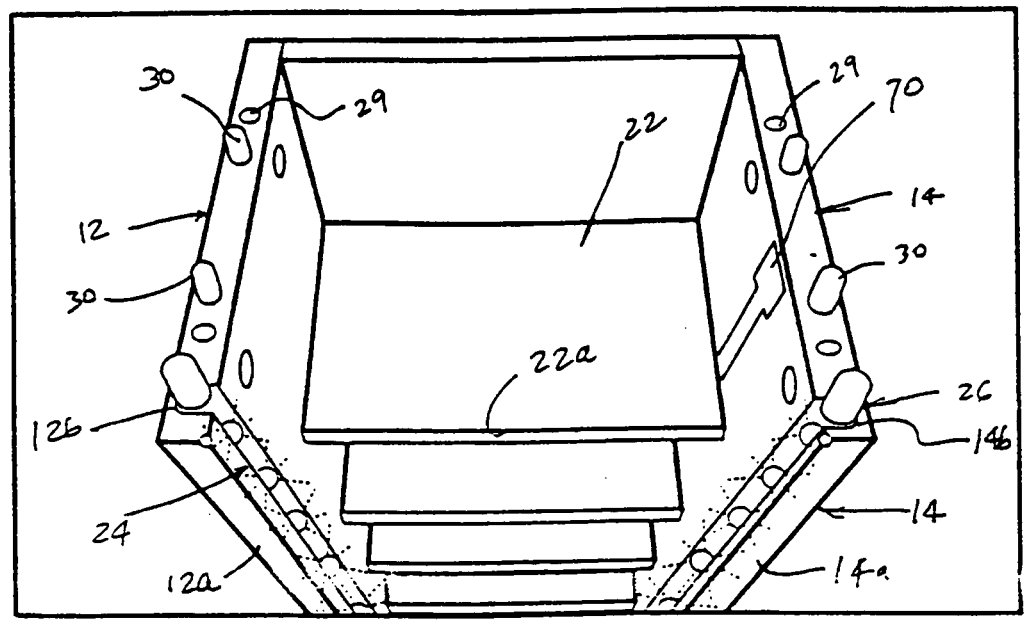
FIG. 7 is a top perspective view of the cabinet assembly of FIG. 4 with the top removed.

Referring to FIGS. 3-7, lighted cabinet assembly 10 includes a pair of light strips 24 and 26 that are mounted in cabinet assembly 10 adjacent the outer edges 12a and 14a of sidewalls 12 and 14. As best seen in FIG. 7, light strips 24 and 26 are mounted in elongated recesses 12b and 14b that are formed in sidewalls 12 and 14, respectively. Recesses 12b and 14b are positioned adjacent outer edges 12a and 14a and, preferably, between outer edges 22a of shelf elements 22 and outer edges 12a and 14a of sidewalls 12 and 14, respectively, to thereby illuminate at least the front portions of the shelves and the media or items supported on shelves 22. As will be more fully described below, the depth of each recess 12b and 14b may be varied to vary the reach of the light projected by the respective light strips 24 and 26.

Referring again to FIGS. 4-7, top wall 18 is mounted to sidewalls 12 and 14 by a plurality of fasteners 28. For example, fasteners 28 may comprise cam screw posts that are mounted in top wall 18 and extend through openings 29 provided in the respective sidewalls where they are engaged therein by cam screws 29a, which are mounted in the respective sidewalls. In addition, the connection may include dowels 30 that extend upwardly from the respective sidewalls and extend into corresponding openings provided in top wall 18. It should be understood that the construction of the lighted cabinet assembly may be achieved using just dowels or other conventional fasteners, such as nails, screws, or the like. Furthermore, the components may be assembled using adhesives, though the preferred construction uses releasable fasteners so that the assembly can be dismantled.

Figure 8:
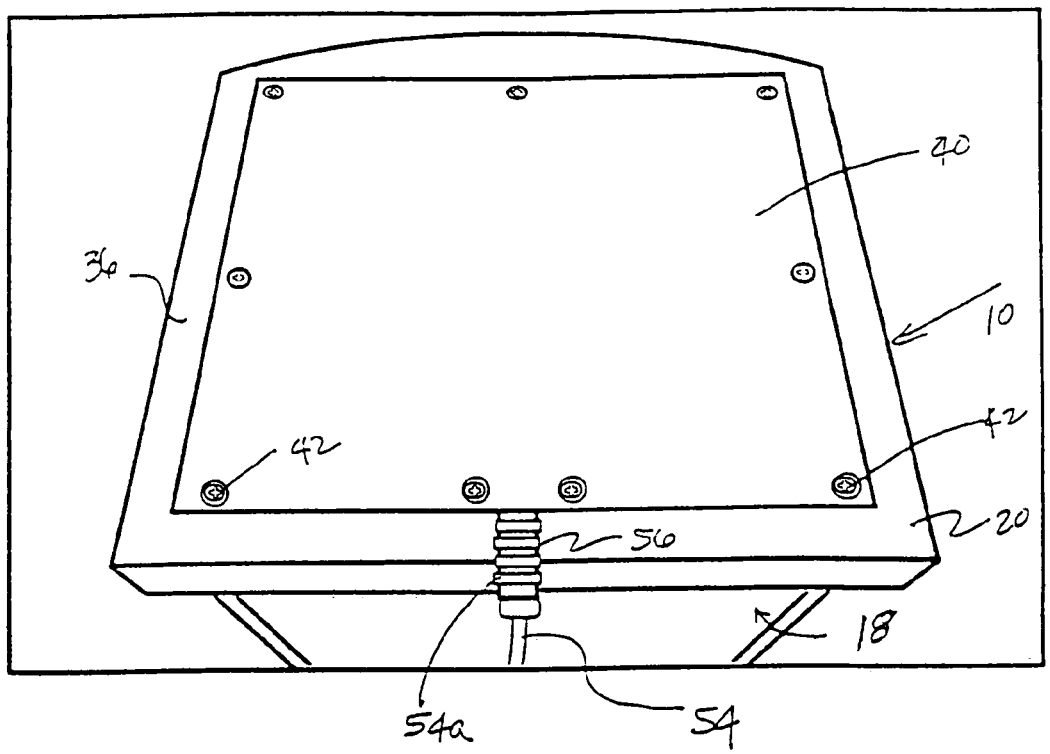
FIG. 8 is a bottom perspective view of the base of the lighted cabinet assembly.
Figure 9:
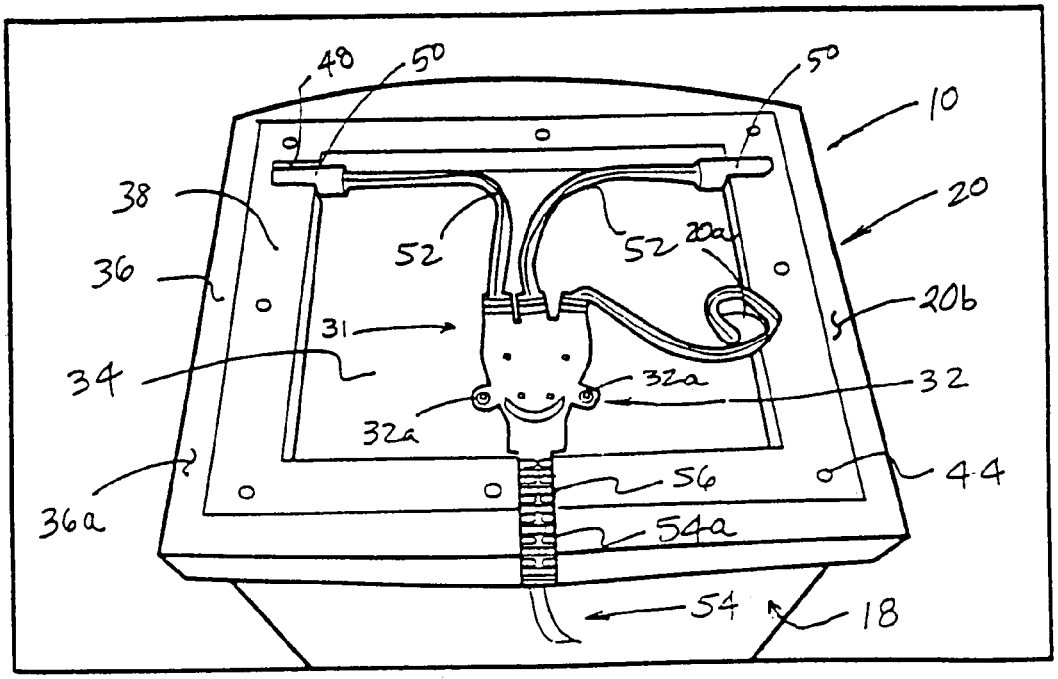
FIG. 9 is a similar view to FIG. 8 with the base cover removed to illustrate the power cord assembly that powers the light strips mounted in the lighted cabinet assembly.
Figure 10:
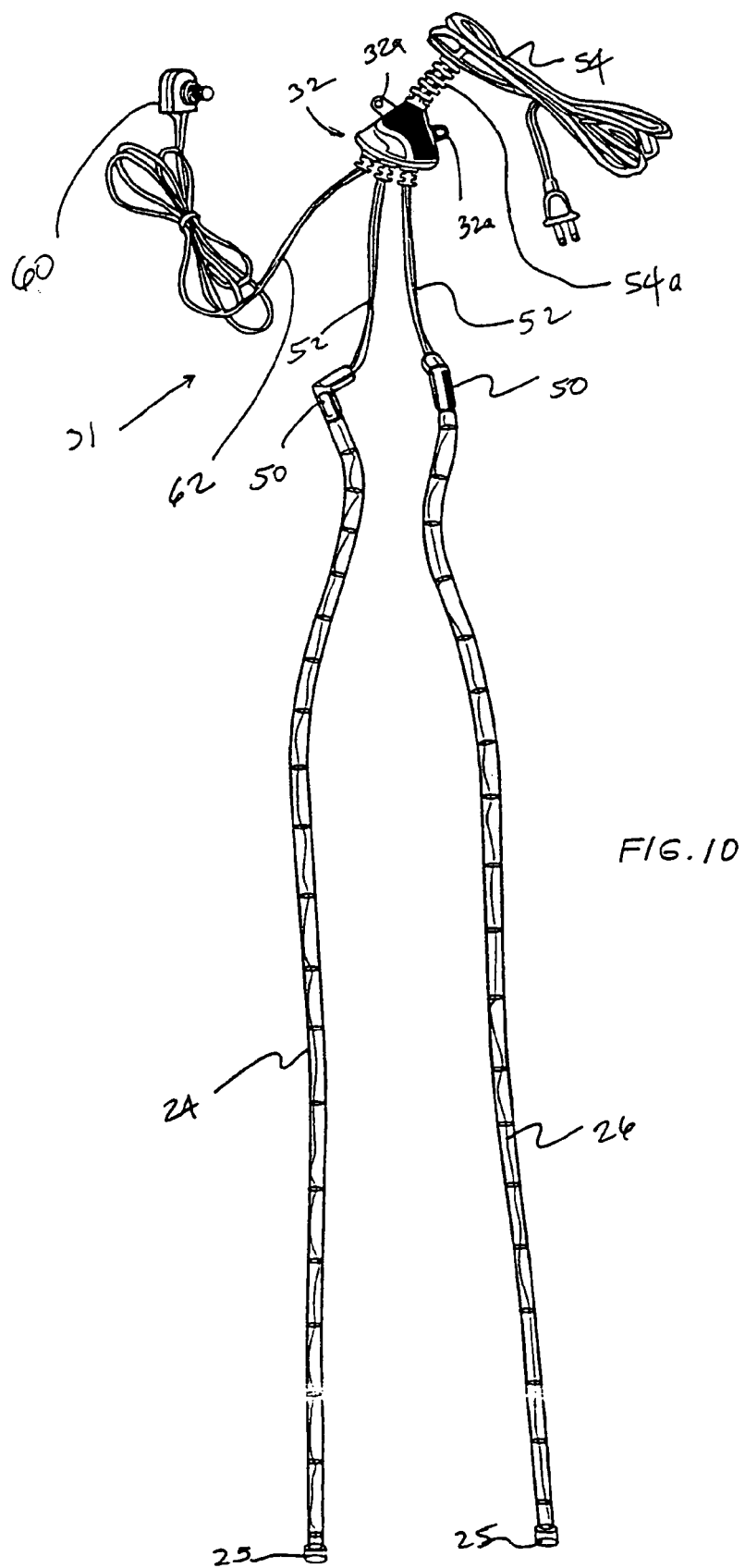
FIG. 10 is a perspective view of the power cord assembly and light strips coupled to the power cord assembly and a light strip switch and switch cable.

Referring to FIGS. 8-10, light strips 24 and 26 are powered by a power cable assembly 31, which is substantially contained in base 20 of lighted cabinet 10. Furthermore, as will be more fully described below, the connection between the power cable assembly and the respective light strips is formed by a 90° coupling 50 so that the power harness 32 and light strip cables 52 may be contained in a generally planar arrangement within the base.

Again referring to FIG. 9, base 20 includes a lower surface 20b for facing support surface 11, an upper surface 20c (FIG. 1) a central recessed portion 34 and an outer perimeter portion 36, which extends around recessed portion 34. Base 20 includes a second, inner perimeter portion 38, which extends around recessed portion 34. Perimeter portion 38 is recessed with respect to bottom or lower surface 36a of outer perimeter portion 36 for receiving a cover 40, which when mounted to perimeter portion 38 forms a substantially flush arrangement with perimeter portion 36 to thereby provide a substantially planar bottom surface for base 20 and, further, forms a closed, but accessible compartment within base 20. In the illustrated embodiment, cover 40 is secured to perimeter portion 38 by a plurality of fasteners 42 that extend into a corresponding plurality of mounting openings 44 formed in perimeter portion 38. However, it can be appreciated that cover 40 may be mounted using dowels, nails, or an adhesive. Though, it is preferable that cover 40 is removable to access to power cable assembly 31.

Figure 11:
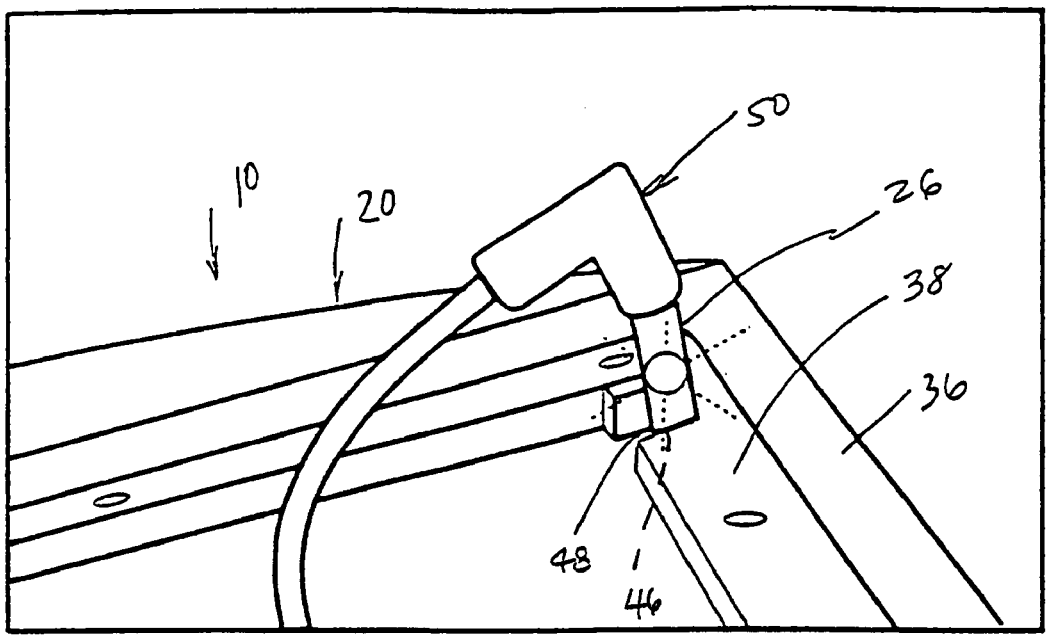
FIG. 11 is an enlarged detailed view illustrating the insertion of the light strip into the base of the lighted cabinet assembly.
Figure 12:
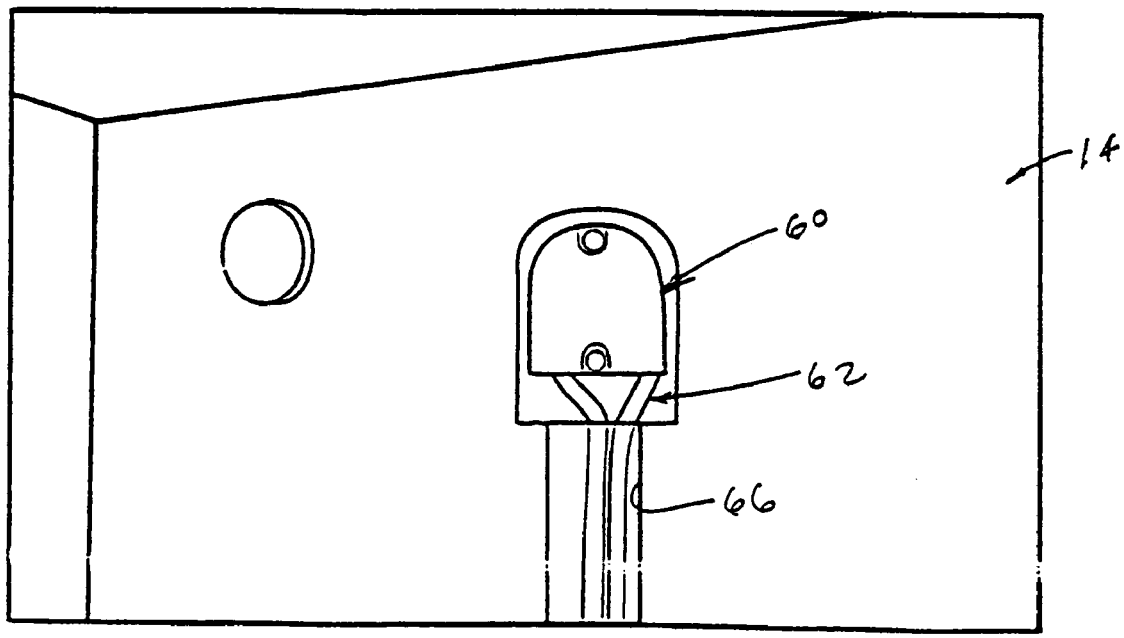
FIG. 12 is an enlarged inside perspective view of the lighted cabinet illustrating the switch and switch cable cavity with a plastic cover installed.
Figure 13:
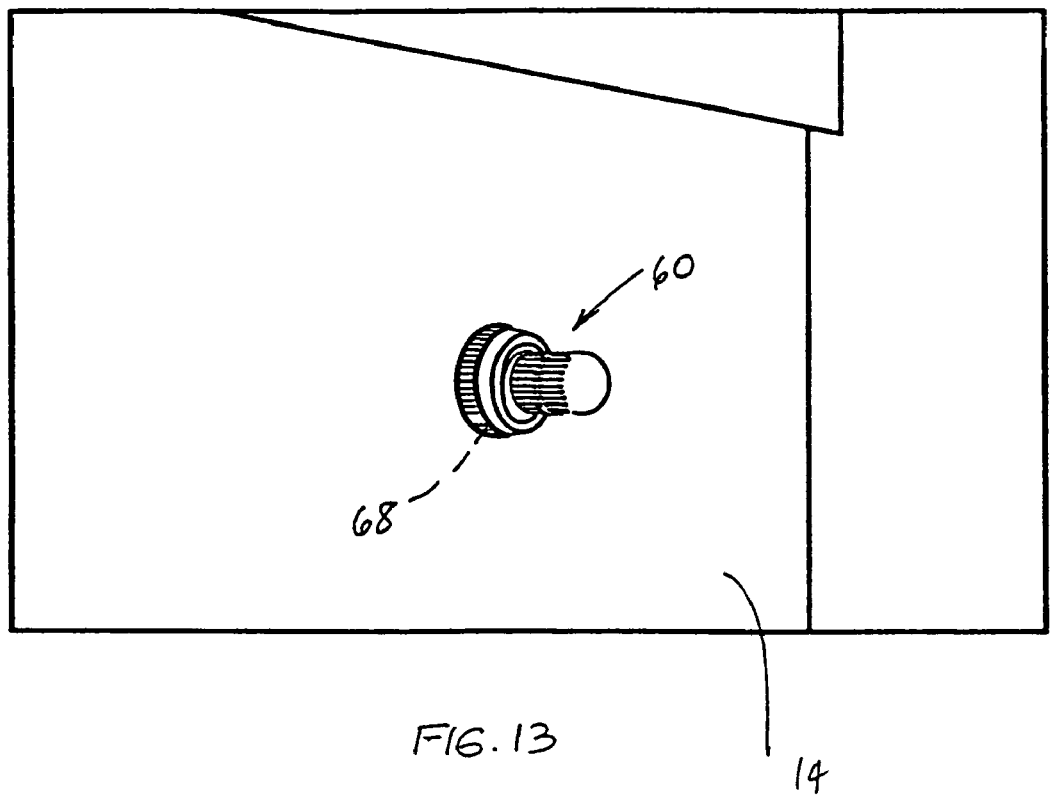
FIG. 13 is a partial perspective view of the top end of the exterior of the cabinet illustrating the switch for the light strips.

Referring to FIG. 11, light strip 26 is inserted through base 20 through a notch 48 provided in perimeter portion 38 and an opening 46 provided in base 20, which aligns with the respective recess in sidewall 14. As previously noted, power cable assembly 31 preferably includes a 90° coupling 50 for coupling to each light strip so that the portion of the power cable assembly 31 contained in base 20 may maintain a generally planar arrangement within recess 34 and, further, occupy a minimal amount of space, while coupling to the light strips 24 and 26 that extend perpendicularly to the base. Notches 48 may be sized to provide friction fits with couplers 50 to secure cables 52 of power cable assembly 31 in base 20. In this manner, the overall height of base 20 may be significantly reduced to thereby maximize the storage space within lighted cabinet assembly 10.

Referring to FIG. 10, in the illustrated embodiment power cable assembly 31 includes wire harness 32 and a light strip cable 52 for each light strip 24, 26. However, it should be understood the light strips may be connected in series and powered by a single light strip cable, though this would eliminate the ability to individually turn on or off the light strips. In addition, power cable assembly 31 includes a power cable 54 that extends through base 20 and exits base 20 through an opening 56 formed in the back of base 20.

Preferably, cable assembly 31 includes a power cord strain relief member 54a to reduce the risk of damage to the wiring or sheath of power cord 54. Optionally, harness 32 includes a pair of mounting tabs 32a to secure harness 32 in recess 34.

In the illustrated embodiment, light strips 24 and 26 are actuated by a switch 60, which is mounted to cabinet assembly 10 and connected to harness 32 by a switch cable 62. Switch 60 may comprise a single position switch—or may comprise a multi-position switch to allow selective powering of the individual light strips. In the illustrated embodiment, switch 60 is mounted to the upper end of sidewall 14 and may comprise a rotatable knob or a push-in knob to actuate the respective light strips.

Figure 3:
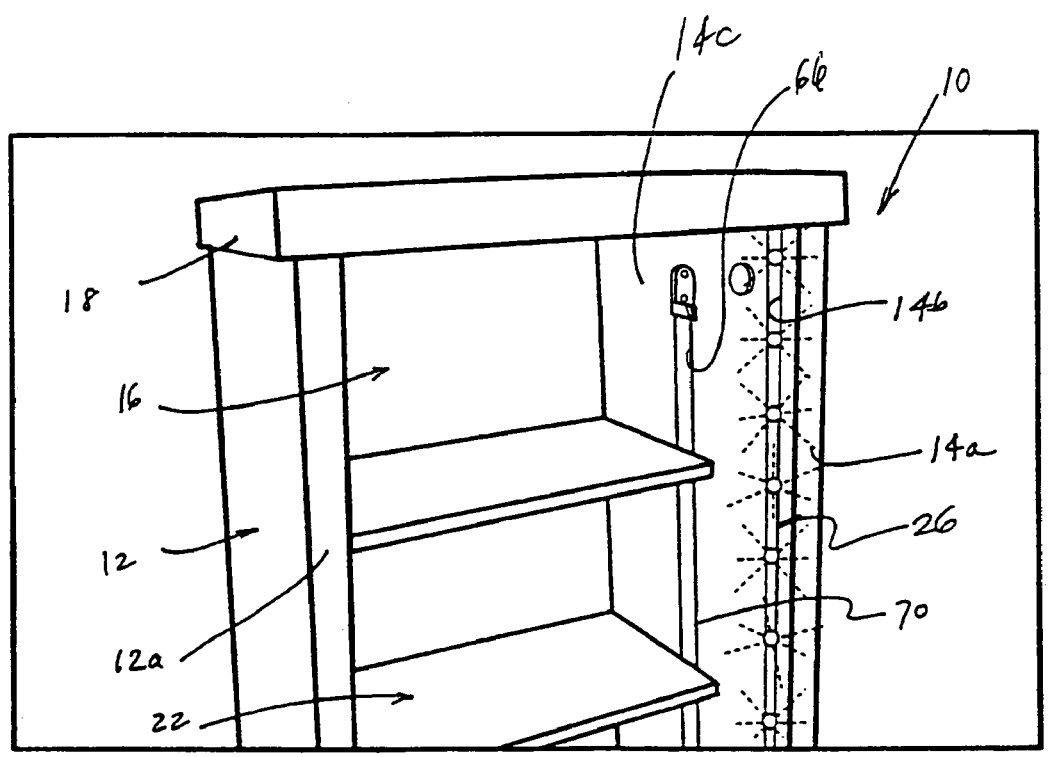
FIG. 3 is an inside perspective view with the media removed to illustrate the inside of the cabinet assembly.
Figure 4:
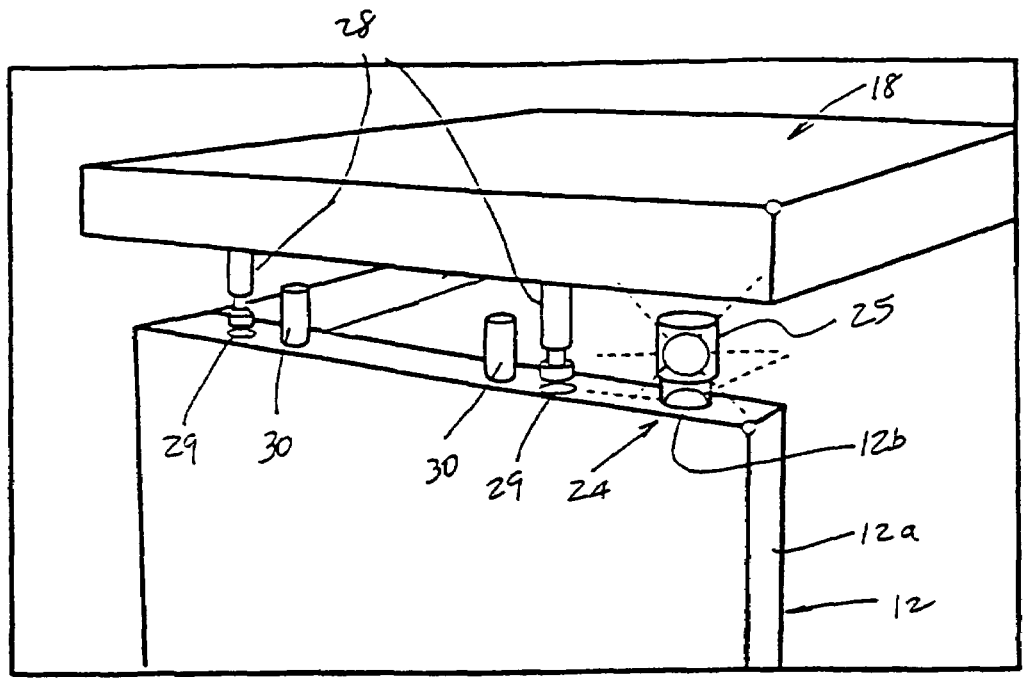
FIG. 4 is a partial perspective view of the top end of the cabinet assembly with the top member removed.
Figure 5:
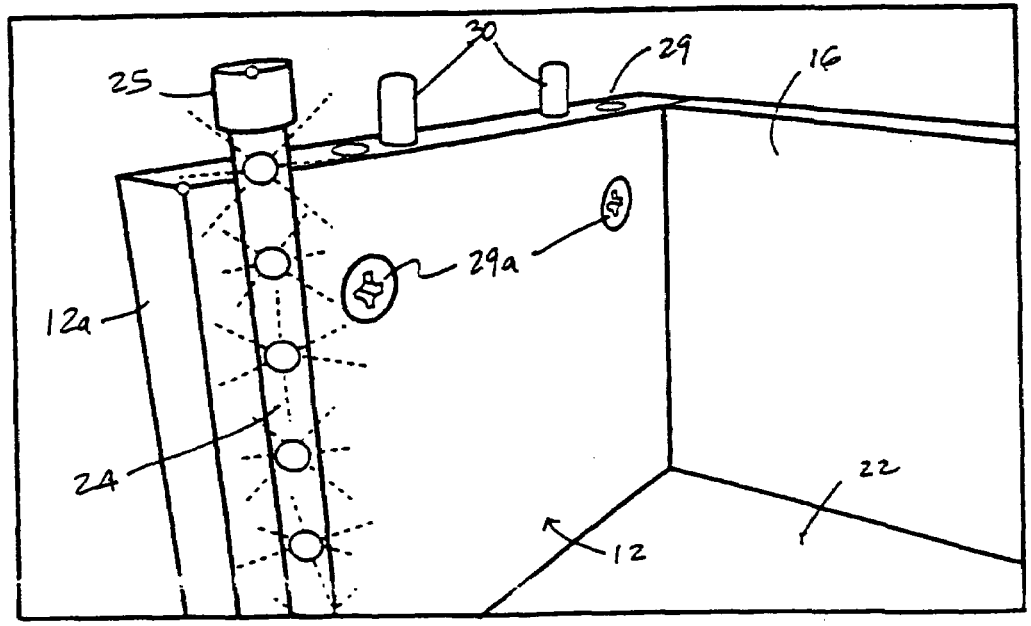
FIG. 5 is an inside left-hand side perspective view of the cabinet assembly of FIG. 4 with the top member removed.

As best understood from FIGS. 3, 6, and 9, switch cable 62 extends from base 20 through an opening 20a (FIG. 9) and through sidewall 14 through a passageway 66 formed in sidewall 14, which is formed in the inner surface 14c of sidewall 14 so as not to detract from the exterior appearance of the cabinet. Switch cable 62 connects to switch 60, which is mounted inside wall 14 and extends through an opening 68 provided in sidewall 14 so that the light strips may be actuated from the outside of the cabinet. To conceal passageway 66, switch 60, and switch cable 62, passageway 66 may be fitted with a cover 70 (FIG. 7), such as a plastic snap-fit cover. Cover 70 may be formed from a single member or from one or more members so that access to the switch may be achieved by removing just a portion of the cover.

Figure 14:
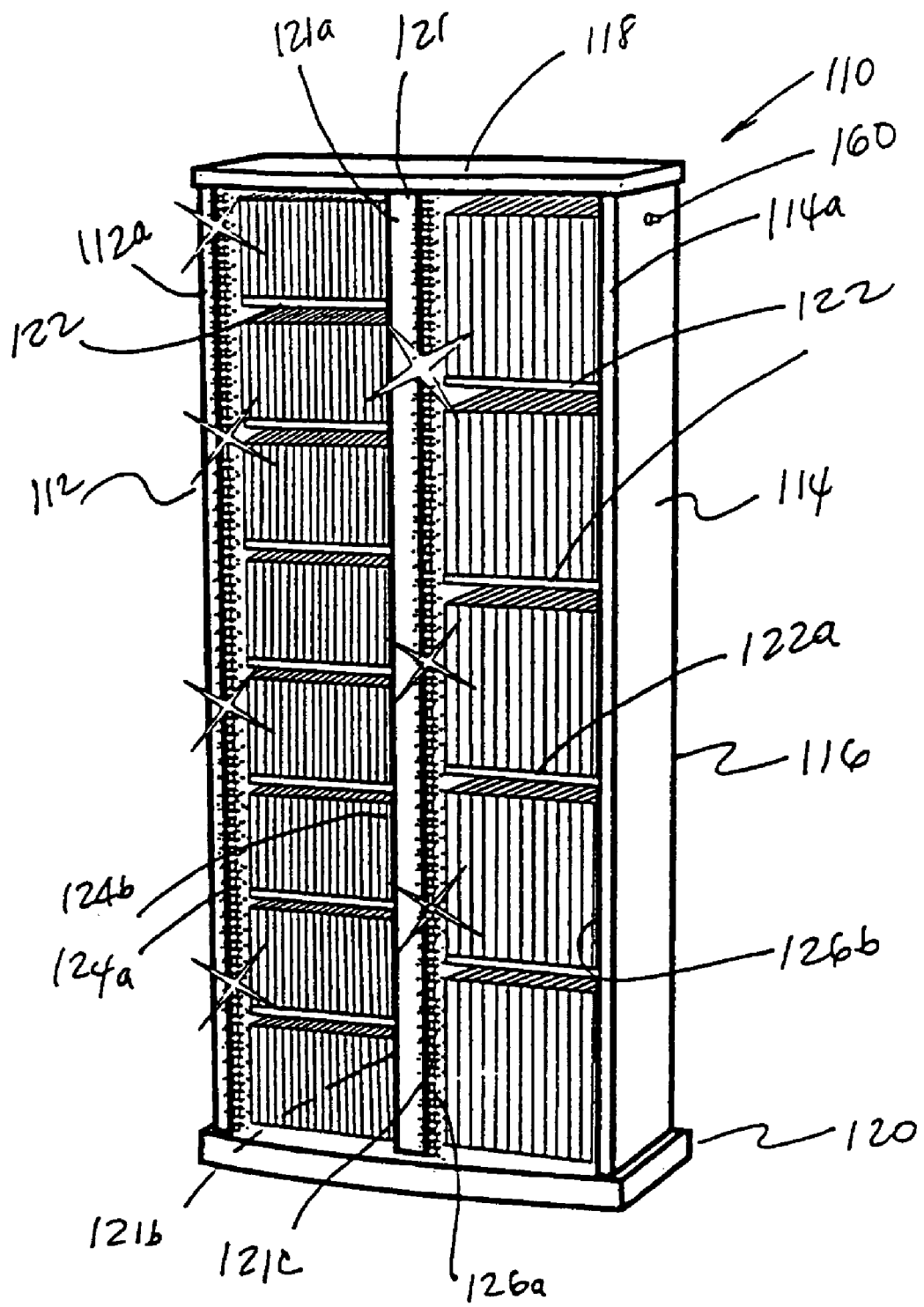
FIG. 14 is a perspective view of a double column embodiment of the lighted cabinet assembly of the present invention.
Figure 15:
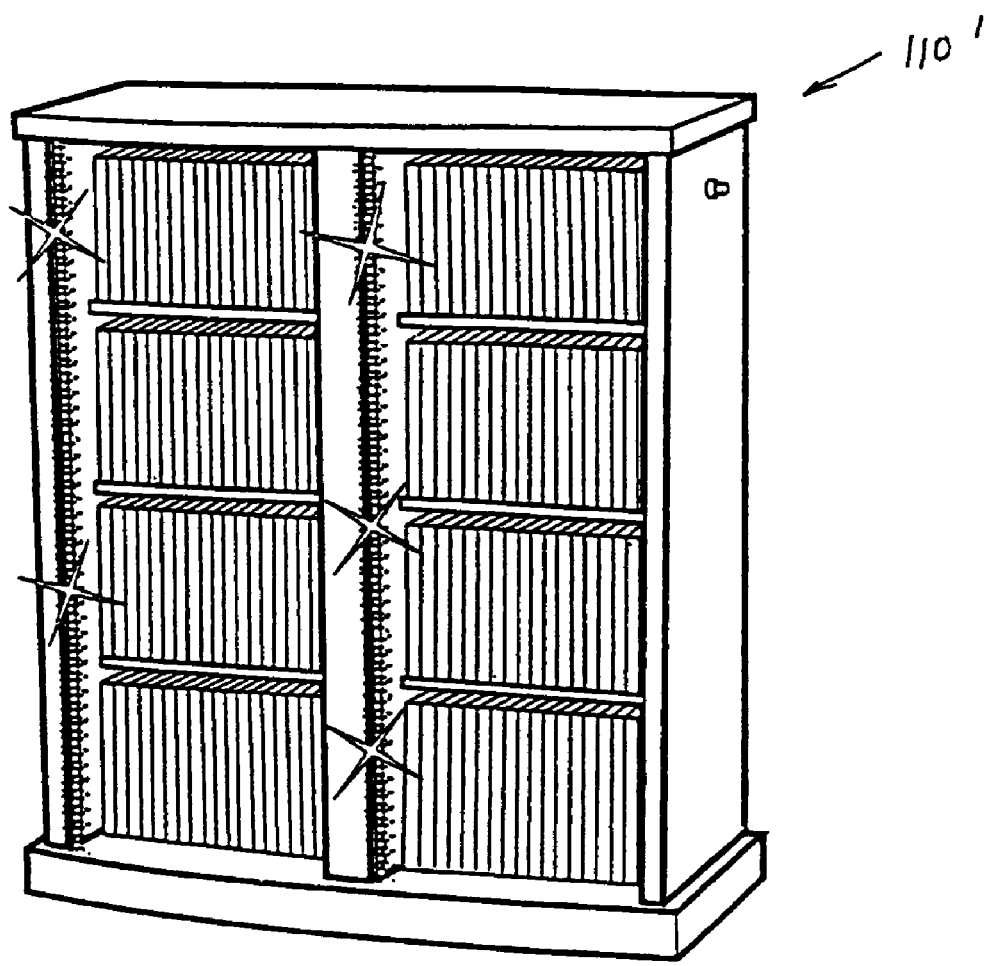
FIG. 15 is a perspective view of another embodiment of the double column lighted cabinet assembly of the present invention.
Figure 16:
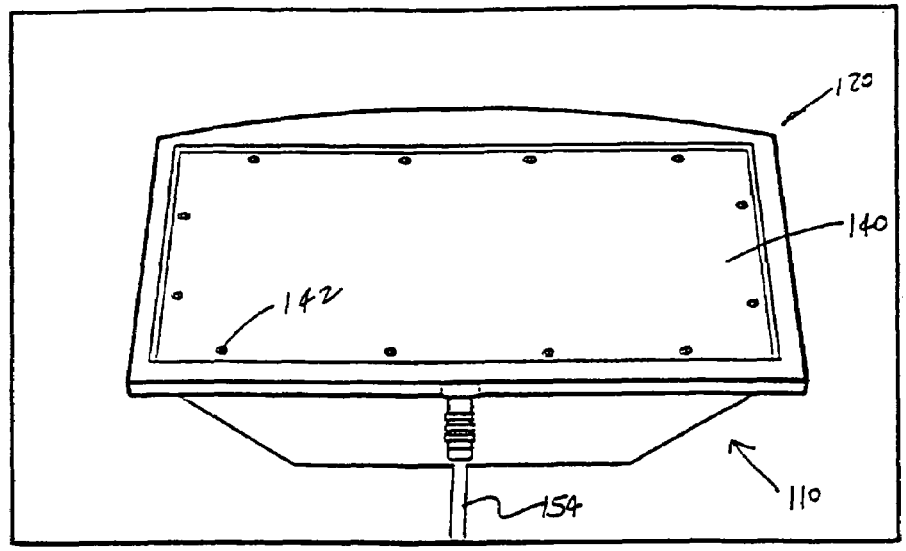
FIG. 16 is a bottom perspective view of the double column lighted cabinet assembly.
Figure 17:
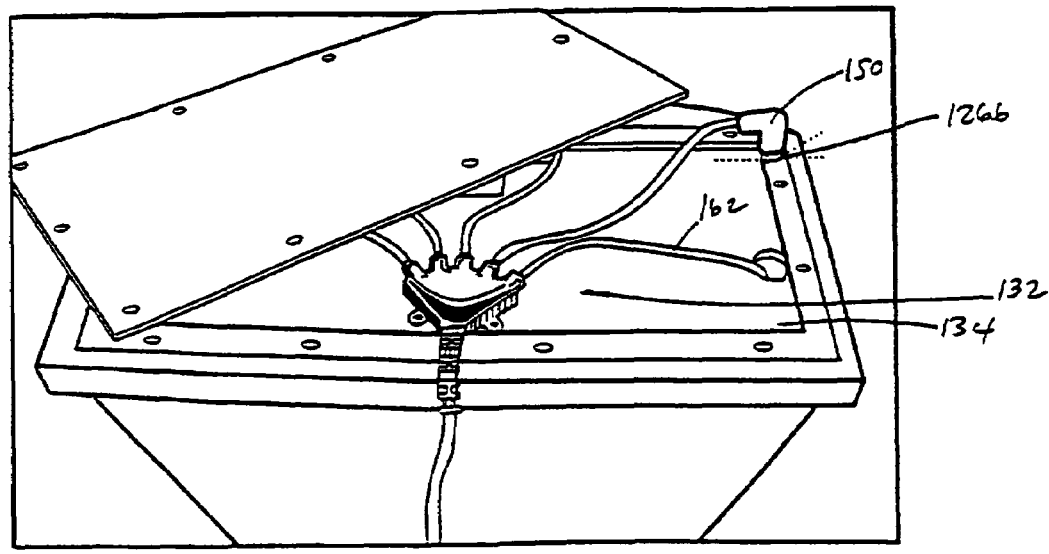
FIG. 17 is a similar view to FIG. 16 with the base cover partially removed.

Referring to FIG. 14, the numeral 110 generally designates a double column light cabinet assembly of the present invention. Light cabinet assembly 110 is of similar construction to light cabinet assembly 10 and includes a pair of sidewalls 112 and 114, a back wall 116 and a top wall 118, which interconnect sidewalls 112 and 114. Sidewalls 112 and 114 and back wall 116 are similarly mounted to a base 120, which houses a power cable assembly for the respective light strips 124a, 124b, 126a, and 126b, which are mounted in cabinet assembly 110, which will be more fully described below. In addition, cabinet assembly 110 includes an intermediate wall 121 that extends from base 120 to top wall 118 to thereby provide an intermediate support for the respective shelves 122, which are mounted between sidewall 112 and intermediate wall 121 and between intermediate wall 121 and sidewall 114 to thereby provide additional storage space. Similar to the previous embodiment, the height and width of the cabinet may be varied, such as shown in reference to lighted cabinet assembly 110' illustrated in FIG. 15.

As previously noted, lighted cabinet assembly 110 includes four light strips, which are positioned adjacent respective outer edges or surfaces 112a, 121a, and 114a of sidewall 112a, intermediate wall 121, and sidewall 114. In addition, light strips 124a, 124b, 126a, and 126b are preferably located between outer edges or surfaces 112a, 121a, and 114a and the outer edges 122a of shelf elements 122. In the illustrated embodiment, intermediate wall 121 has a thicker cross-section than either sidewall 112 or 114 to accommodate the respective recesses 121b and 121c formed in intermediate wall 121 to receive the respective light strips. However, it can be appreciated that the thickness of the respective sidewalls and intermediate wall may be commensurate in size. In the illustrated embodiment, intermediate wall has the same depth as sidewalls 112 and 114; however, it should also be understood that intermediate wall may have a shorter depth. In this manner, intermediate light strips 124b and 126a may be eliminated so that light is directed inwardly from the light strips mounted sidewalls 112 and 114. However, to minimize shadowing, it is preferable to include the intermediate light strips.

Referring to FIGS. 16-19 and 21, light strips 124a, 124b, 126a, and 126b are powered by a power cable assembly 131 similar to power cable assembly 31. Power cable assembly 131 includes a light strip cable 152 for each light strip, a power cable 154 that exits base 120 through an opening 156 formed in base 120, and a switch cable 162 for coupling to switch 160, which is also mounted to cabinet assembly 110. Optionally, the switch may have multiple positions to actuate one or more of the light strips, as previously noted. Similar to the previous embodiments, light strip cables 152 are coupled to the respective light strips 124a, 124b, 126a, and 126b by 90° couplers 150 so that power harness 132 and cables 152 may assume a generally planar arrangement within recess 134 of base 120, similar to the previous embodiment.

Figure 18:
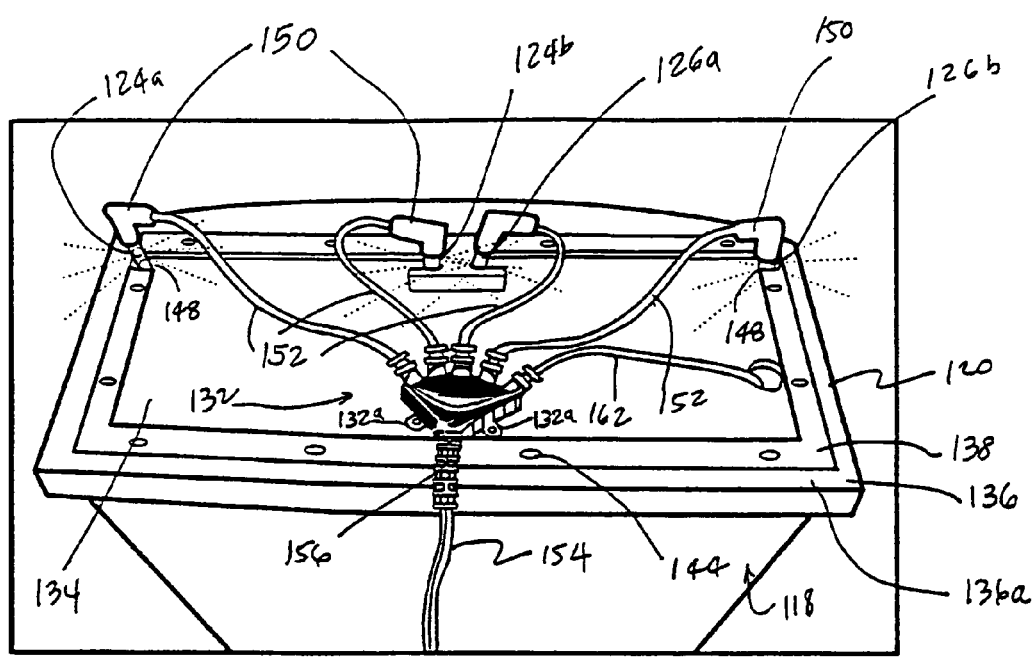
FIG. 18 is a similar view to FIG. 17 with the cover fully removed illustrating the power cord assembly connecting to the light strips mounted in the cabinet assembly and, further, connecting to the switch through the base of the cabinet.

As best seen in FIG. 18, base 120 includes a central recessed portion 134, which is surrounded by an outer perimeter portion 136 and an inner perimeter portion 138. Similar to the previous embodiments, inner perimeter portion 138 is recessed with respect to the outer surface 136a of perimeter portion 136 for receiving a cover 140 therein. Preferably, inner perimeter portion 138 is recessed such that cover 140 forms a substantially flush arrangement with the outer surface 136a of perimeter portion 136. Similarly, cover 140 is secured to inner perimeter portion 138 by a plurality of fasteners 142 that extend into a corresponding plurality of mounting openings 144 provided in inner perimeter portion 138.

Figure 19:
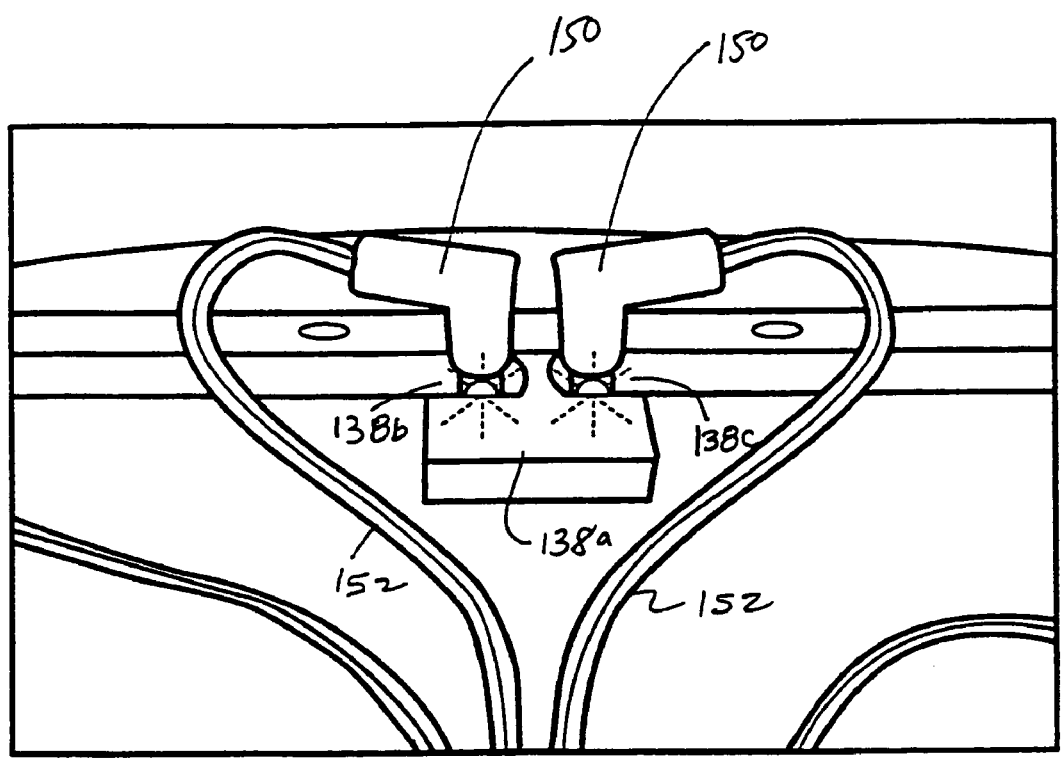
FIG. 19 is an enlarged detailed view of the connection between the light strip cables and the central light strips.
Figure 20:
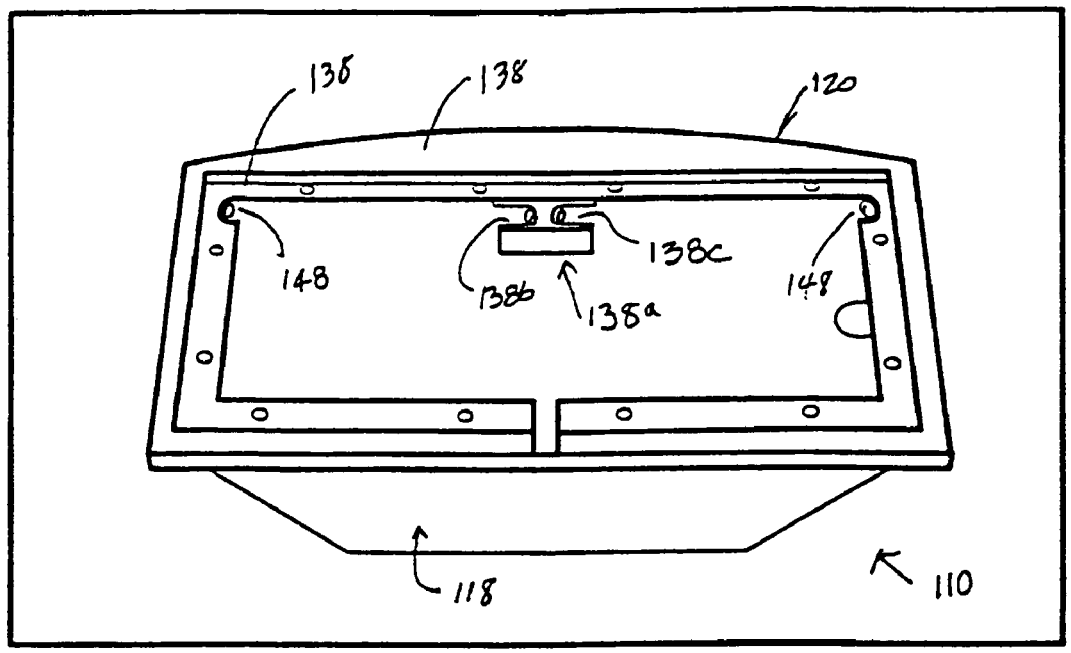
FIG. 20 is a similar view to FIG. 18 with the power cable assembly and light strips removed for clarity.
Figure 21:
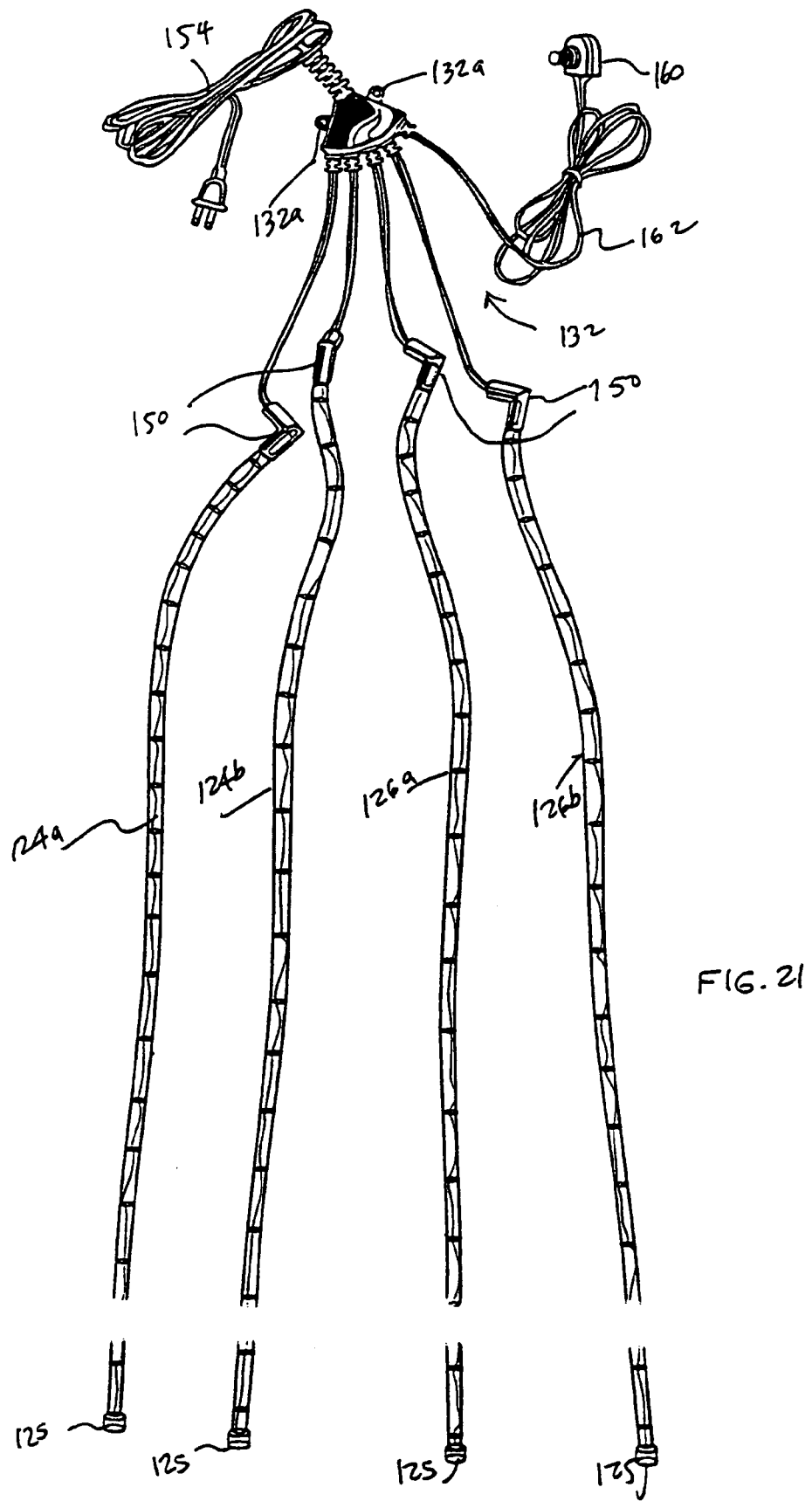
FIG. 21 is a perspective view of the power cord assembly connected to the light strips and to the switch.

Referring to FIG. 19, inner perimeter portion 138 includes an inwardly extending flange 138a with an opposed pair of notches 138b, 138c formed therein, which align with the respective openings provided in base 120 which align with recesses 121b and 121c of intermediate wall 121. Optionally and preferably, notches 138b and 138c are sized to provide a friction fit with couplers 150 to thereby secure the respective light strips at their respective proximal ends to base 120. Similarly, couplers 150 of light strips 124a and 126b are similarly optionally secured in the respective notches 148 of inner perimeter portion 138. Furthermore, cable harness 132 preferably includes mounting tabs similar to the previous embodiment to secure cable harness 132 to base 120 in recess 134. For further details of the construction of base 120, reference is made to the previous embodiment.

As previously noted, the respective lighted cabinet assemblies 10, 10', 10 and 10' are lighted in a manner to provide optimal light visibility of the media or articles supported therein and, further, to minimize shadowing. In addition, cabinets 10, 10', 110, and 110' may be illuminated by light strips incorporating light emitting diodes to generate less heat than associated with conventional incandescent lights. In the preferred embodiments, light strips 24, 26, 124a, 124b, 126a, and 126b preferably comprise a plurality of light sources, such as incandescent light sources or light emitting diodes, which minimize heat generation, and, further, preferably comprise a plurality of light sources that are encapsulated in a flexible extrusion, such as a PVC extrusion. As would be understood, therefore, when light strips 24, 26, 124a, 124b, 126a, and 126b incorporate light emitting diodes they generate far less heat than associated with conventional incandescent lights sources and, further, consume less power than conventional incandescent light sources. In addition, given the directional nature of light emitting diodes, the direction of the light in the cabinet assembly can be controlled or adjusted to achieve the desired lighting effect. Furthermore, the depth of the recesses may be increased to permit the light strips to be placed further into the sidewalls, which would reduce the light coverage to, for example, the front of the shelves. Furthermore, PVC extrusions are flexible and compressible so that the recesses provided in the sidewalls may be configured to provide a compression or friction fit so that the light strips may be mounted in the respective sidewalls by simply inserting them into the recesses, which will retain the light strips therein by friction. As noted, the position of the light strips in the respective recesses may be adjusted to vary the lighting effect within the cabinet.

To further secure the light strips in the cabinet assemblies, the upper distal end of the respective light strips are preferably provided with end caps 25 (FIGS. 4 and 5) and 125 (FIG. 21), which may be inserted into the corresponding opening or recess provided in upper wall 18 to thereby secure the upper distal end of the respective light strips within the cabinet. As previously noted, the proximal ends of the respective light strips are preferably secured in the base by 90° couplers, which preferably have a friction fit with the respective notches provided in the inner perimeter portion of the base.

While several forms of the invention have been shown and described, other changes and modifications may be made. For example, thought the illustrated embodiments have been described in reference to the use of a single light strip for each wall, it should be understood that discrete sections of light strips may also be used, with each discrete light sections, for example, being separately powered so that they may be individually be turned on or off. Furthermore, additional light strips may be included in the light cabinet assembly, for example, such as at the back wall of the cabinet assembly or at inner locations of the respective sidewalls. Also as noted, the back wall may be eliminated and additional light strips may be positioned at the back side of the cabinet to illuminate the, now, other outer edges of the shelves. Furthermore, a light strip may be incorporated into the upper wall. Though not previously noted, the respective walls and components of the shelf assemblies are preferably formed from wood components or components formed from wood material. However, it should be understood that one or more of the components of the cabinet assembly may be made from plastic, composite materials, or the like. Therefore, it will be understood that the embodiments shown in the drawings and described above are merely for illustrative purposes, and are not intended to limit the scope of the invention, which is defined by the claims that follow as interpreted under the principles of patent law including the doctrine of equivalents.

I claim:

1. A lighted cabinet assembly comprising:
   a pair of spaced apart sidewalls, each of said sidewalls including an elongate recess;
   a top wall interconnecting said sidewalls, said sidewalls defining an interior space therebetween;
   at least one shelf supported between said sidewalls;
   a base for supporting said cabinet assembly on a support surface, said base having an upper surface and a lower surface for facing the support surface, said sidewalls terminating at said upper surface and being mounted to said base, said elongated recesses extending from said base up at least a portion of said sidewalls;
   a recessed portion at said lower surface;
   a perimeter portion extending around said recessed portion;
   a cover inward of said perimeter portion for covering said recessed portion;
   at least one light strip positioned in each of said elongated recesses for illuminating at least a portion of said interior; and
   a power cable assembly including a power cable for electrically coupling to a power supply, at least one light strip cable electrically coupled to said light strips, and a power harness coupling said power cable to said light strip cable for selectively powering each of said light strips, said power harness and said light strip cables being arranged in a generally planar arrangement in said recessed portion at said lower surface of said base.

2. The lighted cabinet assembly according to claim 1, wherein said base has an overall height of less than about 3 inches.

3. The lighted cabinet assembly according to claim 2, wherein said base has an overall height of less than about 2 ½ inches.

4. The lighted cabinet assembly according to claim 1, wherein each of said sidewalls includes an outer edge, said elongated recesses spaced inwardly from said outer edges.

5. The lighted cabinet assembly according to claim 4, wherein said at least one shelf includes an outer edge, said elongated recesses positioned between said outer edge of said shelf and said outer edges of said sidewalls.

6. The lighted cabinet assembly according to claim 1, wherein said elongated recesses extend from said base to said upper wall.

7. The lighted cabinet assembly according to claim 1, further comprising a back wall interconnecting said sidewalls.

8. The lighted cabinet assembly according to claim 7, wherein said back wall extends between said upper wall and said base.

9. The lighted cabinet assembly according to claim 1, further comprising a switch, said power cable assembly further including a switch cable electrically coupled to said switch.

10. The lighted cabinet assembly according to claim 9, wherein said switch is mounted to one of said sidewalk.

11. The lighted cabinet assembly according to claim 10, wherein said one of said sidewalls includes a passage extending up from said base to said switch at an inner surface of said sidewall, said switch cable extending up from said base through said passage to couple to said switch.

12. The lighted cabinet assembly according to claim 1, wherein each of said light strips comprise a plurality of light sources.

13. The lighted cabinet assembly according to claim 12, wherein said light sources arc encapsulated in a flexible extrusion.

14. The light cabinet assembly according claim 13, wherein said flexible extrusion comprises a PVC extrusion.

15. A lighted cabinet assembly comprising:
   a pair of spaced apart sidewalls, each of said sidewalls including an outer edge and an elongate recess adjacent a respective outer edge;
   a top wall interconnecting said sidewalls, said sidewalls defining an interior space therebetween;
   at least one shelf support between said sidewalls;
   a base for supporting said cabinet assembly on a support surface, said base having an upper surface and a lower surface for facing the support surface, said sidewalls terminating at said upper surface and being mounted to said base, said elongated recesses extending from said base up at least a portion of said sidewalls, said base including a recess at said lower surface to define a compartment;

an inner perimeter portion of said lower surface extending around said recess, said inner perimeter portion having a plurality of notches, each of said notches aligning with a respective elongate recess;

an outer perimeter portion of said lower surface extending around said inner perimeter portion;

a cover at said inner perimeter portion and flush with said outer perimeter portion for covering said recessed portion;

at least one light strip positioned in each of said elongated recesses for illuminating at least a portion at said interior;

a power cable assembly including a power cable for electrically coupling to a power supply, a light strip cable for each light strip, a coupler for electrically coupling each said light strip cable to each light strip, and a power harness coupling said power cable to said light strip cables for selectively powering each of said light strips, said couplers comprising 90° couplers wherein said power harness and said light strip cables may be arranged in a generally planar arrangement in said compartment of said base; and said notches at said inner perimeter portion receiving and retaining said 90° couplers therein.

16. The lighted cabinet assembly according to claim 15, wherein said recess extends no greater than 2 inches into said base.

17. The lighted cabinet assembly according to claim 15, wherein said base has an overall height of less than about 3 inches.

18. The lighted cabinet assembly according to claim 15, wherein said at least one shelf includes an outer edge, said elongated recesses positioned between said outer edge of said shelf and said outer edges of said sidewalls.

19. The lighted cabinet assembly according to claim 15, wherein said elongated recesses extend from said base to said upper wall.

20. The lighted cabinet assembly according to claim 15, further comprising a switch, said power cable assembly further including a switch cable electrically coupled to said switch.

21. The lighted cabinet assembly according to claim 20, wherein said switch is mounted to one of said sidewalls.

22. The lighted cabinet assembly according to claim 15, wherein each of said light strips comprise a plurality of light sources.

23. A method of assembling a lighted cabinet comprising:

providing a base having a recessed portion at a lower surface, an inner perimeter portion extending around said recessed portion, and an outer perimeter portion extending around said inner perimeter portion;

providing a cover;

providing a plurality of shelves;

providing a pair of sidewalls, each including an elongate recess;

supporting the shelves between the sidewalls;

supporting the sidewalls at the base;

providing a light strip;

positioning the light strip in the elongated recess to illuminate a portion of one or more of the shelves;

providing a power harness and a power cable for electrically coupling to a power supply;

coupling the light strip to the power cable with the power harness;

arranging the power harness and the power cable in a planar arrangement in the base; and positioning said cover at said inner perimeter portion and flush with said outer perimeter portion to cover said recessed portion.

* * * * *

UNITED STATES PATENT AND TRADEMARK OFFICE
CERTIFICATE OF CORRECTION

| | | |
|---|---|---|
| PATENT NO. | : 7,367,685 B2 | Page 1 of 1 |
| APPLICATION NO. | : 11/358574 | |
| DATED | : May 6, 2008 | |
| INVENTOR(S) | : Gregory R. Moll | |

It is certified that error appears in the above-identified patent and that said Letters Patent is hereby corrected as shown below:

Column 3:
Line 21, "hilly" should be --fully--.
Line 22, "supoort" should be --support--.

Column 6:
Line 48, "10, 10', 10 and 10'" should be --10, 10', 110 and 110'--.

Column 8:
Line 42, Claim 10, "sidewalk." should be --sidewalls.--.
Line 52, Claim 13, "arc" should be --are--.
Line 54, Claim 14, "Insert --to-- after "according".

Column 9:
Line 14, Claim 15, "at said" should be --of said--.

Signed and Sealed this

Third Day of February, 2009

JOHN DOLL
*Acting Director of the United States Patent and Trademark Office*